United States Patent Office 2,753,645
Patented July 10, 1956

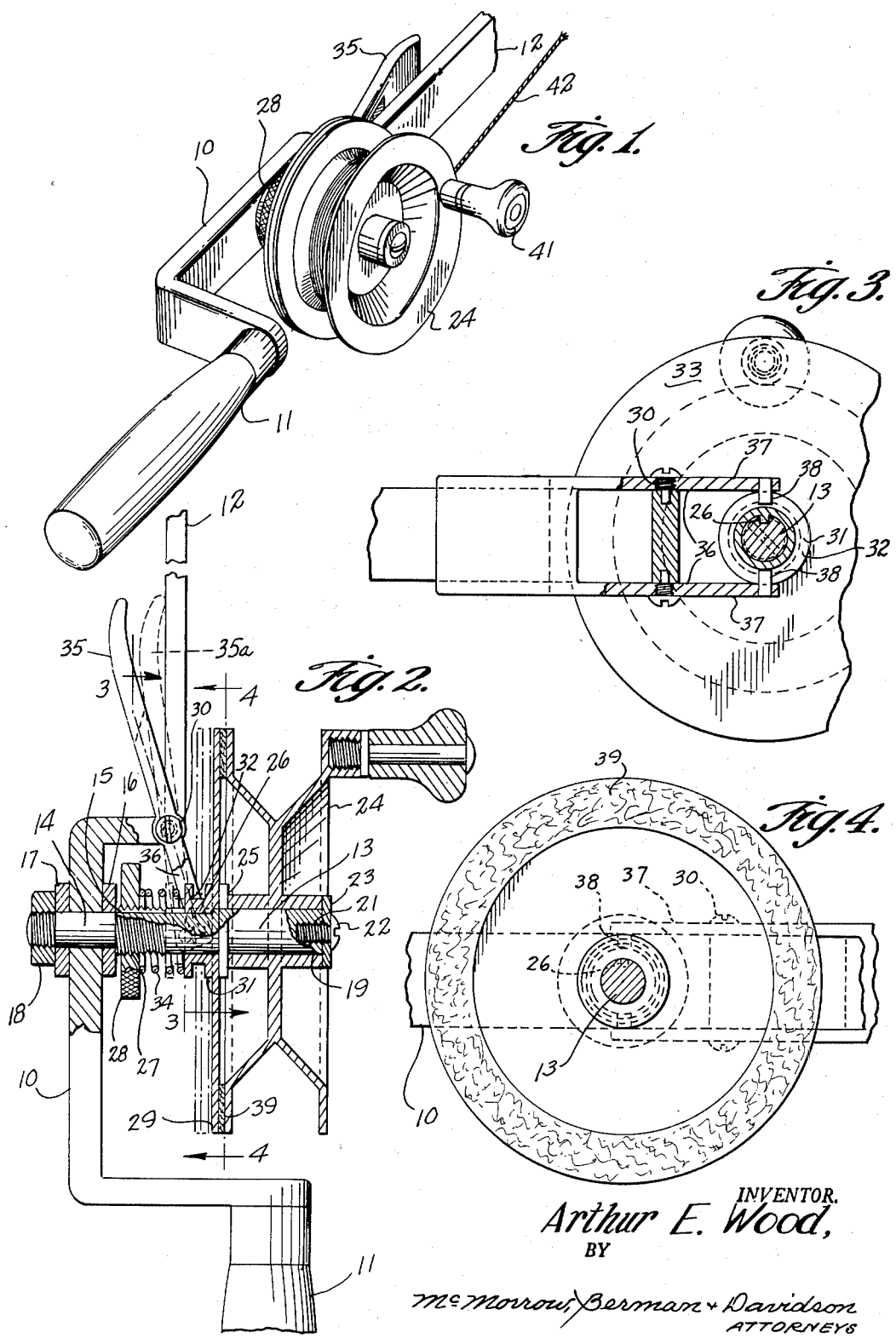

2,753,645

FISHING REEL

Arthur E. Wood, Champaign, Ill.

Application May 7, 1954, Serial No. 428,155

2 Claims. (Cl. 43—20)

The present invention relates to an improvement in fishing reels and provides a new type of reel for trolling in which the reel may be either free spinning or may be drag controlled to permit the retention of the bait or lure at a constant distance behind the boat but free to be taken by an attacking fish without breaking the fishline.

The present invention has for its principal object the provision of an inexpensively constructed and designed reel for the trolling fisherman who desires an easily handled and adjusted reel for average conditions and one which permits a wide variation in drag pressure for various conditions of use.

Another object of the present invention is to provide a reel of single action type, that is, one without compound gearing between the reel and the winding handle, and one which will accommodate a large spool of wire or fishline which may be stripped substantially free from the reel without hindrance.

A further object of the invention is to provide a reel which may be braked to a stop by pressure on the extreme periphery of the reel for a total of all of the reel's circumference of one face or side, thereby permitting equalized drag pressure which will not warp the reel and permits construction of lighter and less expensive materials.

A still further object of the present invention is to provide a reel in which the drag pressure is easily and readily adjustable and one in which because the drum of the reel is relatively large and the drag pressure is distributed to the outer edge of the reel body, very little change in drag pressure is needed to restrain line stripping between conditions of full and nearly empty reel, and which therefore subjects the line to the minimum restraint and danger of breakage when snagged or when the fish strikes.

Yet another object of the present invention is to provide a reel which is normally "braked" and may be placed in the boat without attention and which may be adjusted to such drag or brake as will keep the line at the desired trolling distance but will yield for stripping of the line from the reel after the fish strikes without danger of having the reel yanked overboard.

These and other objects and advantages of the present invention will be readily apparent from the following description when considered in connection with the annexed drawings, in which:

Figure 1 is a view in perspective of the present invention.

Figure 2 is a view in side cross section.

Figure 3 is a detailed view partly in cross section taken on line 3—3 of Figure 2, and Figure 4 is a further view partly in cross section showing the cork braking surface on the drag plate as seen on line 4—4 of Figure 2.

Referring to the drawings in which like reference characters indicate like parts throughout the several views, it will be seen that the invention consists of a bracket 10 bent to substantially a square C-shape and having a handle 11 at one end, the other end 12 projecting forwardly and accommodating either a disjointed and tapering pole or a solid one, neither of which are here illustrated. Midlength of the bracket is journaled an arbor 13 having two diameters, the portion or end 14 remote from the arbor 13 being larger in diameter and providing a shoulder 15 which presses against the washer 16 and is the means, with washer 17 and nut 18 of securely fixing the arbor at its end 14 to the bracket.

The other end 19 is provided with internal threads 21 for a short distance of its length to receive the screw 22 which holds washer 23 on the arbor and prevents the reel 24 from endwise moving on the arbor in one direction, the reel 24 being held from movement on the arbor in the other direction by another shoulder 25, integrally formed with the arbor, which, from the shoulder 25 to the shoulder 15 is cut on one side with a keyway 26 and is threaded for a portion of that distance as indicated at 27 to receive the threaded and knurled adjusting nut 28. Keyed to the arbor next to the inside face of the reel 24 is the drag plate 29 having a hub 31 which is circumferentially cut with the recess 32. The drag plate 29 is slidable on the arbor 13 and is normally pressed against the side or face 33 of the reel 24 by the compression spring 34 which is positioned on the arbor between the hub 31 and the nut 28.

A lever 35 is pivotally mounted at 30 to the bracket 10 and is bifurcated at one end 36 to have parallel arms 37 each fitted with an inwardly directed abutment 38 which fits in the recess 32 on each side of the hub 31. A cork ring 39 on the outer edge of the confronting face of the drag plate 29 insures quiet brake or drag action, with the control of friction common to cork and metal surfaces as in brake shoes of conventional make.

A handle 41 on the other face of the reel permits winding of the cord 42, as seen in Figure 1, and the relatively large and wide periphery of the reel accommodates a large spool of line or wire. The lever 35 is movable to the dotted line 35a which lifts the drag plate away from contact with the reel and releases braking action, which is seen to be adjustable by changing the compression tension of the spring 34, the drag plate 29 being keyed to the arbor and not free to rotate as is the reel 24.

The drag action is normally in on position until the lever 35 is pressed, and the reel may be left unattended with the line trolling behind the boat, the adjustment of the nut 28 permitting the line to be stripped from the reel on any additional degree of resistance in the water, such as due to a snag or to the pull of a struck fish.

It will be seen therefore that the present invention provides an extremely useful sporting device and while a single embodiment of the invention has been here shown and illustrated, many other embodiments of the invention are contemplated and may be practiced without departing from the spirit and scope of the invention as set forth in the appended claims.

What is claimed is:

1. A fishing reel comprising: a bracket including a bight portion and a pair of end portions extending from the bight portion at right angles thereto, one of said end portions being longer than the other, said bracket further including a handle and a pole supporting extension projecting from the respective end portions at the extremities of said end portions remote from the bight portion in parallel relation to each other and to the bight portion; a reel shaft carried by the bight portion and projecting laterally therefrom between and in parallel relation to the end portions; a reel rotating on said shaft, the handle extending substantially in the plane of rotation of the reel, said pole-supporting extension and reel being disposed in laterally spaced relation; a drag plate carried by the reel shaft between the reel and bight portion adjacent one side of the reel; an annular facing of friction producing material engageable against said side of the reel and carried by the plate; a recessed hub integral with the drag plate, said shaft having a threaded part between the hub and bight portion; a nut threaded on said part; a spring held under compression between the hub and nut, said spring normally biasing the drag plate toward the reel; and a lever pivotally connected intermediate its ends to the bracket at the juncture of the extension and the shorter end portion, that part of the length of the lever between its pivot axis and one of its ends projecting obliquely to the length of said pole-supporting extension at the side of the extension opposite that facing the reel, the remaining part projecting into the recessed part of the hub to shift the drag plate out of engagement with the reel against the restraint of the spring, responsive to lateral shifting of the first named side toward said pole supporting extension.

2. A fishing reel assembly comprising: a bracket formed intermediate its ends with a generally C-shaped part and formed at its opposite ends with a pole-supporting extension and handle, respectively projecting in opposite directions from opposite ends of the C-shaped part; a reel shaft carried by the C-shaped part; a reel rotatably mounted upon said shaft, said reel rotating in a plane offset laterally from the pole-supporting extension with the reel projecting forwardly beyond the C-shaped part alongside said extension; a brake plate of a diameter corresponding to the outer diameter of the reel, mounted upon said shaft adjacent the side of the reel confronting the pole-supporting extension; an annular facing of friction-producing material carried by said plate and extending continuously along and in contact with a portion of the surface of one side of the reel, thus to engage against the reel on shifting of the brake plate axially of the shaft toward the reel; resilient, yielding means circumposed about said shaft and tensioned to normally shift the brake plate in a direction to frictionally engage said facing with the reel; a circumferentially recessed hub rigid with the brake plate within said bight part; and a lever pivotally mounted intermediate its ends upon the forward end of the C-shaped part of the bracket, one end of the lever engaging in the recess of the hub, and the other end of the lever projecting laterally from the pole-supporting extension in oblique relation to the length of said extension, said second-named end of the lever being disposed along the side of the extension opposite that adjacent the reel, whereby to shift the brake plate out of engagement with the reel responsive to lateral movement of the second-named end of the lever toward the pole-supporting extension.

References Cited in the file of this patent

UNITED STATES PATENTS

| | | |
|---|---|---|
| 2,129,903 | Benson | Sept. 13, 1938 |
| 2,410,331 | Aubertin | Oct. 29, 1946 |
| 2,535,404 | Fry | Dec. 26, 1950 |
| 2,548,174 | Rastler | Apr. 10, 1951 |